United States Patent [19]

Daswick et al.

[11] 4,293,052
[45] Oct. 6, 1981

[54] LIGHTWEIGHT TWO-WHEELED VEHICLE

[76] Inventors: Alexander C. Daswick, 647 Orange Grove, S. Pasadena, Calif. 91030; Archie C. Landry, 7855 Oakdale Ave., Canoga Park, Calif. 91306

[21] Appl. No.: 925,422

[22] Filed: Jul. 17, 1978

[51] Int. Cl.³ .................. B62D 61/02; B60R 21/02
[52] U.S. Cl. ........................ 180/219; 180/274; 280/281 W; 296/65 A; 297/216
[58] Field of Search .............. 280/281 LP, 281 W; 296/65 A; 297/193, 216; 180/219, 274, 271

[56] References Cited

U.S. PATENT DOCUMENTS

| | | | |
|---|---|---|---|
| 1,817,848 | 8/1931 | Rogers | 180/30 |
| 3,016,967 | 1/1962 | Rehfeld | 180/30 |
| 3,712,400 | 1/1973 | Barnes | 180/27 |
| 4,065,144 | 12/1977 | Winchell | 180/27 |

FOREIGN PATENT DOCUMENTS

| | | | |
|---|---|---|---|
| 1430028 | 3/1969 | Fed. Rep. of Germany | 296/65 A |
| 777333 | 2/1935 | France | 180/30 |
| 436302 | 1/1948 | Italy | 280/281 LP |
| 540464 | 3/1956 | Italy | 296/65 A |

*Primary Examiner*—John P. Silverstrim
*Attorney, Agent, or Firm*—Christie, Parker & Hale

[57] ABSTRACT

A lightweight vehicle which utilizes a single large wheel in the rear that carries most of the weight with a single small wheel in front for guidance. The driver's seat is normally positioned immediately in front of the large wheel and the engine is positioned immediately to the rear of the large wheel, with the center of mass of the vehicle being below and forward of the axle of the large wheel. The passenger seat is connected to a frame extending between the two wheels by a parallelogram type linkage which connects to a bumper extending in front of the vehicle. The linkage is arranged such that on impact of the bumper, the parallelogram linkage causes the seat to move upwardly and tilt backwardly over the top of the large wheel to help protect the driver in the event of a crash.

8 Claims, 4 Drawing Figures

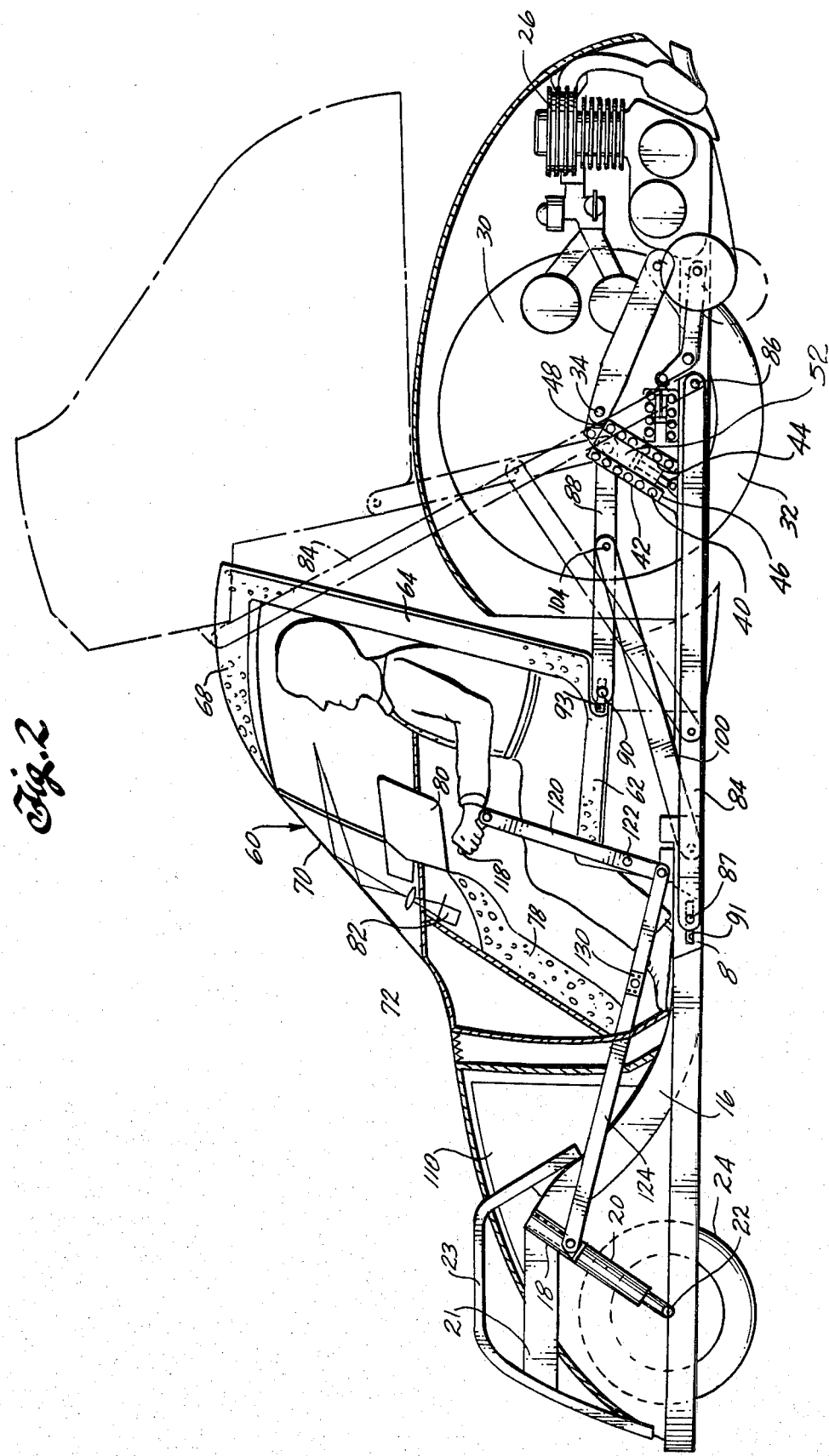

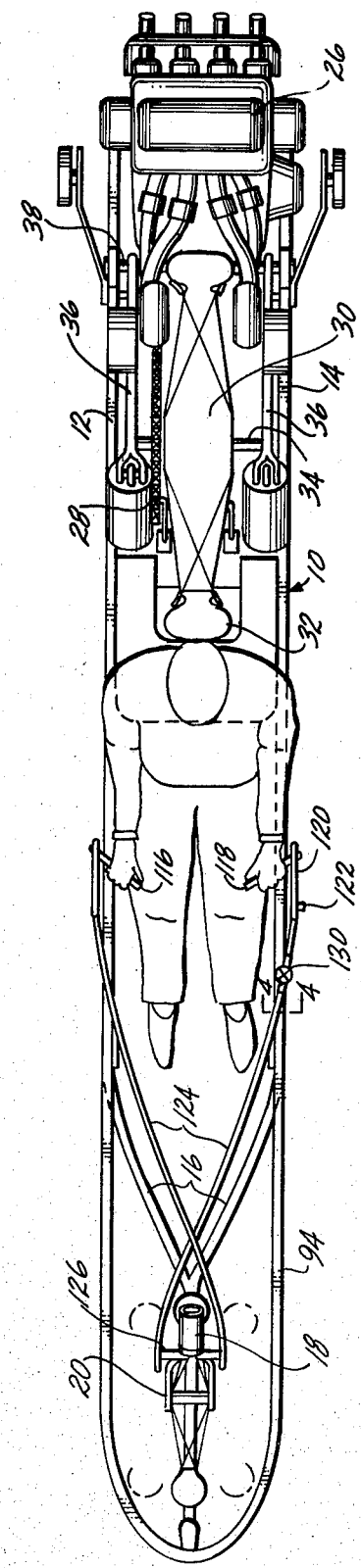

LIGHTWEIGHT TWO-WHEELED VEHICLE

FIELD OF THE INVENTION

This invention relates to a lightweight engine driven vehicle, and more particularly, to a vehicle which operates primarily as a two-wheeled vehicle.

BACKGROUND OF THE INVENTION

In recent years there has been a growing emphasis on developing vehicles which are substantially more efficient in the use of energy. Conventional automobiles have been scaled down and made lighter. However, there are a number of practical limits imposed in the design of automobiles in terms of meeting safety requirements while maintaining satisfactory acceleration rates and satisfactory highway speeds for the modern highway systems of this country. While motorcycles and smaller motor bikes (mopeds) have gained in popularity because of their combination of light weight and high fuel efficiency, as well as maneuverability and compact design, they are hazardous to operate and provide the occupant no protection from the elements.

SUMMARY OF THE INVENTION

The present invention is directed to an improved lightweight vehicle which is similar to the motorcycle in that it normally operates on two wheels. The vehicle of the present invention retains many of the advantages of the motorcycle in that it is capable of normal highway speeds, has acceleration characteristics at least equal to the majority of other vehicles presently encountered on the highways, is highly maneuverable to provide maximum safety control, provides maximum braking rates under complete control to avoid collisions, and occupies a minimum of space so as to provide greater efficiency in the use of storage, parking, and highway usage. Unlike the conventional motorcycle, however, the vehicle of the present invention encloses the driver so as to provide protection from the elements, such as wind, rain, heat, or cold, and also provides much greater protection for the driver in the event of a collision.

The vehicle of the present invention also provides more stable and efficient operation than the conventional four-wheeled vehicle or a motorcycle. This is accomplished in the present invention design by arranging for up to ninety percent of the weight of the vehicle to be concentrated on a single large wheel, thus concentrating the friction forces at the wheel and simplifying the drive mechanism. Unlike conventional four-wheeled vehicles, the center of gravity of the lightweight vehicle of the present invention is located below and slightly to the front of the axle of the large drive wheel. Thus the problems normally associated with a four-wheeled vehicle, such as the large variation in the forces applied to the individual wheels during acceleration, deceleration and turning from side to side, are largely avoided. In the vehicle of the present invention, acceleration produces a moment opposing the driving torque applied to the wheel, and deceleration produces a moment opposing the braking torque to the wheel. Lateral force transfer is also avoided since the lateral force acts through the plane of symmetry of the vehicle at all times and the centrifugal component which causes a tipping moment is balanced by the displacement of the center of gravity to the side in an appropriate amount by the banking of the vehicle in a turn.

These and other advantages of the present invention are achieved by providing a vehicle having a single large drive wheel utilizing a tire of large cross-section and low pressure. The drive wheel is mounted to the rear and above a frame on which is mounted the engine, the engine being positioned to the rear of the drive wheel. To provide protection from the elements, the driver is seated in a totally enclosed capsule. The capsule is supported on the frame and is connected to the frame by a parallogram linkage system which allows the capsule to move upwardly from its normal position in front of the drive wheel in a direction in which the capsule tilts backwardly over the drive wheel, moving the passenger from an upright position to a tilted or reclining position with his head extending back over the engine. A bumper extends in front of the vehicle. On making contact in a collision and being forced backward toward the drive wheel, the bumper, through suitable linkage, causes the capsule to be tilted upwardly and back to its rearmost position. In this position the human body is much better able to withstand high deceleration forces encountered in a head-on collision.

DESCRIPTION OF THE DRAWINGS

For a more complete understanding of the invention reference should be made to the accompanying drawings, wherein:

FIG. 2 is a side elevational view with the interior of the vehicle exposed and partly in section;

FIG. 3 is a top view with the outer capsule and enclosing structure of the vehicle removed; and FIG. 4 is a sectional view taken substantially on the line 4—4 of FIG. 3.

DETAILED DESCRIPTION

Figure 1:
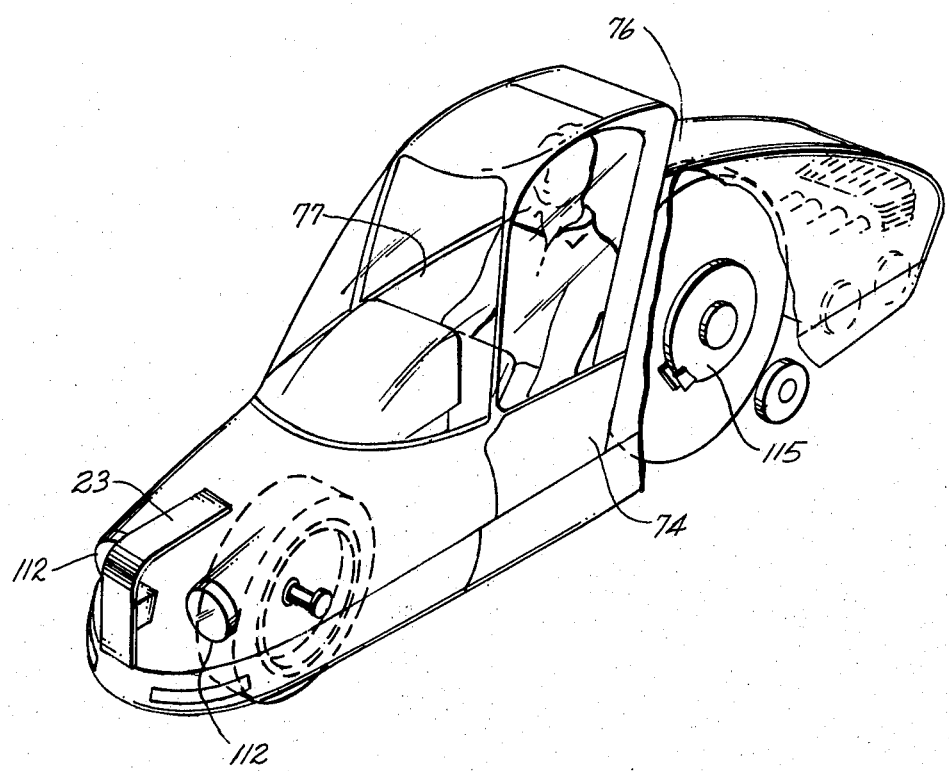
FIG. 1 is a phantom perspective view of the vehicle of the present invention.

Referring to the drawings in detail, the numeral 10 indicates generally the main frame of the vehicle which includes a pair of parallel side rails 12 and 14 which curve upwardly and converge together in the front part of the vehicle as indicated at 16. The portion 16 of the frame 10 terminates in a bearing support member 18 in which is journaled a steering fork 20. The fork 20 is preferably of the telescoping spring type well known to the motorcycle art. A front axle 22 bridges the lower end of the steering fork 20, a front wheel 24 being journaled for rotation on the axle 22. Rotation of the fork 20 in the bearing support 18 turns the wheel 24 to permit steering of the vehicle. A portion of the frame 16 projects in front of the fork 20, as indicated at 21, to provide a mounting for a vertically extending bumper 23. The vertical bumper protects the front wheel and prevents the front of the vehicle from wedging underneath the rear of vehicles which have a high road clearance, particularly trucks.

An engine, indicated generally at 26, is mounted at the rear end of the frame 10. The engine 26 may be any suitable internal combustion engine, such as is commonly used in motorcycles, and which includes a gear transmission for driving an output shaft (not shown). The output shaft is connected through a sprocket and chain drive 28 to drive a rear wheel 30.

The rear wheel 30 is made substantially larger in diameter than the front wheel 24 and is provided with a wide tire 32 for giving good traction and for supporting the majority of the weight of the vehicle. The tire is of a type having a very large footprint area with a relatively low tire pressure. Preferably the tire is filled with an open pore foam or similar substance to provide a damping effect resulting from the pneumatic action of the transfer of air through the pores of the foam. The wheel 30 is journaled for rotation on a rear axle 34 which is supported at either end on a pair of radius arms 36 which extend rearwardly and are pivotally attached to the frame by a shaft 38. The weight of the vehicle is transferred from the side rails 12 to the rear wheel 30 through a pair of spring assemblies on either side of the wheel. Each assembly includes a compression spring 40 mounted inside a cup-shaped housing 42 secured at its lower end of a respective one of the side rails 12 and 14. An inner cylindrical member 44 having a lip 46 at the lower end extends up through the compression spring and terminates in a lug 48 to which the inner end of the respective radius arms 36 are pivotally attached. Thus the downward force exerted by the weight of the vehicle is transferred through the compression spring to the lip 46 and inner cylindrical member 44 to the axle 34 and wheel 30, to the ground. A double-acting hydraulic shock absorber may be mounted inside the inner cylinder 44, as indicated at 52, to provide appropriate damping of the spring action. The hydraulic system of the two double-acting shock absorbers can be interconnected hydraulically so that the displacement of fluid at one end of one shock absorber piston is transferred to the opposite end of the other shock absorber piston to balance the load on the two springs and to maintain the alignment of the axle by forcing the two radius arms to move as a unit. This eliminates the need of having a rigid mechanical interconnection between the two radius arms to make them act as a unit to maintain the alignment of the axle 34.

It will be noted that the frame extends substantially below the axis of rotation of the wheel 30. This relatively low position of the frame and the engine 26 causes the center of mass of the vehicle to be lower than the axis of rotation of the wheel 30. Also the mass is distributed with more weight in front of the axle than behind it so that the actual center of gravity is substantially below and somewhat forward of the axis of rotation of the wheel 30. This gives added stability to the vehicle since the reaction torque tending to rotate the vehicle about the axis 34, both during acceleration and deceleration, produces an opposing moment.

The driver of the vehicle is enclosed within a capsule, indicated generally at 60. The capsule 60 includes a seat 62, backrest 64, an overhead 68, all of which are provided with suitable cushioning or padding material. The capsule includes a windshield 70 and a cowling 72. A door panel 74 on the left side of the capsule is hinged to the front to the cowling 72 and includes a side window 76. The opposite side of the capsule has a side panel 77 and a window 79. The interior of the capsule includes crash panels for the knees and chest, indicated at 78 and 80. Additional padding may be provided above and below the windows of the side panels to protect the driver if the capsule topples sideways. The instruments, indicated at 82, are located in front of the crash panel and project the reading of the instruments on the windshield for easy viewing by the driver.

The entire capsule is supported on the frame 10 and secured by a linkage system which includes a first pair of arms 84 that normally extend parallel to and along the outside of the side rails 12 and 14 of the frame. The arms 84 are pivotally connected to the side rails at the rear of the vehicle, as indicated at 86. The other end of the arms 84 are pivotally connected to the capsule frame by means of brackets 8 and pins 87. A second pair of linkage arms 88 also connect the capsule to the frame. One end of the arms 88 is pivotally connected to the frame through the spring housings 42. The other end of the linkage arms 88 is pivotally connected to the capsule at the rear of the seat 62 by a pin 90. This linkage arrangement allows the capsule to move upwardly from the normal position shown in FIG. 2 to the dotted line position in which the back 64 of the seat is substantially horizontal and the seat 62 is substantially vertical, thus placing the driver in a reclining position with his knees extending upwardly.

The capsule is arranged to be moved into the dotted line position when the vehicle encounters a head-on collision. This action is provided by a substantially U-shaped bumper frame 94 which slidably engages the side rails 12 and 14 of the main frame and extends around the front of the vehicle. As shown in the cross-section of FIG. 4, the side rails 12 and 14 are preferably box sections while the bumper is channel-shaped so as to slidably engage the outside of the side rails of the frame. A retaining plate 96 bridges the inside of the bumper frame to retain the bumper frame in sliding contact with the side rails. A pair of linkage arms 100 interconnect the bumper frame 94 on either side of the vehicle to the upper arms 88. One end of the arms 100 is pivotally connected to the retaining plate 96 by a suitable pin 102. The other end of the arm 100 is pivotally connected to the arm 88 at a central point, as indicated at 104. It will be noted that the arm 100 extends upwardly at an angle to the horizontal. As a result, a horizontal force acting on the front of the bumper 94 forces the bumper backwardly along the frame. This force is translated through the arms 100 to the linkage arms 88, forcing the arms 88 to move upwardly around the rear pivot connections to the frame. As a result the capsule is lifted and moved rearwardly by the linkage arms 88 and 84 into the dotted position. While not specifically shown, this action may, if desired, be power assisted by suitable means such as a piston operating from a compressed gas that is released on impact of the bumper in a collision situation, in the same manner that conventional air bags are inflated on impact. By moving the capsule rapidly upwardly and to the rear of the vehicle, the driver is protected by placing him in a less vulnerable position where he is better able to withstand the forces exerted by the rapid deceleration of the head-on collision. By this arrangement, the capsule is lifted above the level of the engine. The engine with its relatively large mass will tend to tear loose from the frame in the event of a head-on collision, but will pass beneath the capsule. Thus the engine can be permitted to tear loose and move forward so as to remove kinetic energy from the system without endangering the driver. Another advantage of the lifting of the capsule and the driver is that the lifting force produces a reaction force acting downwardly on the wheel, thereby increasing the force of the wheel against the ground. Thus the acceleration of the capsule upwardly improves the braking action by reducing likelihood of skidding between the tire and the ground. Although not shown, the rear wheel brakes may be set automatically in response to the rearward motion of the bumper during the lifting of the capsule, thus relieving the driver of the necessity of maintaining braking action while the capsule is lifting the driver.

One of the important features of the present invention is that at least ninety percent of the weight of the vehicle is concentrated on the rear wheel, thus giving the vehicle at least some of the characteristics of a unicycle. By concentrating the weight over the rear wheel, pitching of the vehicle, which has been a problem in short wheelbase automobiles and motorcycles, is minimized. In order to keep the center of gravity slightly in front of the rear axle so as to concentrate most of the weight on the rear wheel, the position of the capsule may be made adjustable in a fore/aft direction to compensate for differing weights of the drivers. The fore/aft adjustment of the capsule may be provided, for example, by having the pins 87 and 90 movable respectively along slots 91 and 93 in the capsule mounting of the pins. Thus by securing the pins to the capsule at any selected point along the respective slots 91 and 93, the fore/aft position of the capsule can be shifted relative to the frame 16. A suitable differential indicator sensing the weight on the front and rear suspension systems can be used to indicate to the driver when the proper weight distribution is achieved.

The front portion of the vehicle may be provided with a hood section 110 which breaks the wind and enhances the esthetic appearance of the vehicle. The headlights may be incorporated as part of the hood 110, as indicated at 112.

Conventional operating controls are provided in the capsule for operating the brakes, such as the disc brake indicated at 115 on the rear wheel. Guidance of the front wheel for steering is provided by a linkage which includes handles 116 and 118 gripped by the right and left hands, respectively, of the driver. These handles are operated in the same manner as the handles of a conventional handle bar of a motorcycle. Thus, pushing forward with one hand and pulling back with the other hand turns the vehicle in the same manner as pushing forward on one end of a handle bar while pulling back on the other end of the handle bar turns a conventional bike or motorcycle. The handles 116 and 118 are connected to vertical levers 120 pivoted at 122. The lower end of the levers 120 connect through drawbars 124 which cross over each other and are connected to the ends of a cross bar 126 which is rigidly connected to the fork 20. The drawbar 124 on the left side of the vehicle may be hinged, as indicated at 130, to permit the steering lever 120 with its pivot 122 to be swung out of the way with the side door 74 to permit the driver to step into or out of the capsule 60. The pivot 122 is preferably attached to the door so that the steering linkage moves with the door as it is opened and closed.

In order to maintain the stability of the vehicle when it slows down or stops, a pair of outrigger wheels 132 are rotatably supported on the end of arms 134 pivotally connected to the respective side rails 12 and 14, as indicated at 136. The outrigger wheels 132 are urged against the ground by a compression prings 138 with sufficient force to maintain the vehicle in an upright position when the vehicle is at rest. The outrigger wheels are retracted hydraulically by hydraulic cylinders 140 connected between the frame and the arms 134. The hydraulic cylinders when subjected to hydraulic fluid under pressure act to compress the springs 138 and retract the wheels into the operating position shown in FIG. 2. The hydraulic cylinder 140 can be operated from a suitable hydraulic pump (now shown) either driven from the engine or hand-operated by the driver. A bypass valve (not shown) may be controlled automatically to release the hydraulic pressure in the cylinder 140 when the speed of the vehicle drops below a predetermined level, for example, five miles an hour, causing the compression springs 138 to automatically lower the outrigger wheels 132.

What is claimed is:

1. A lightweight vehicle comprising a frame, a single rear drive wheel, means rotatably securing the wheel to the frame at the rear and above the frame, a front wheel rotatably secured to the front of the frame, means including a seat supported on the frame between the front and rear wheels for carrying a passenger, an engine mounted on the frame, transmission means drivably connected the engine to the rear wheel, the center of mass of the vehicle being below the horizontal plane of the axis of rotation of the rear wheel, means for turning the plane of the front wheel to steer the vehicle and means securing the means for carrying a passenger to the frame including a first pair of parallel links pivotally connected at one end to the passenger carrying means along a first common axis parallel to the axis of rotation of the rear wheel and at the other end to the frame to the rear of the seat along a second common axis, the first pair of links extending substantially horizontally, a second pair of links pivotally connected at one end to the passenger carrying means along a third common axis parallel to the first common axis, the third common axis being positioned forward of and below the first common axis, the other end of the links of said second pair being pivotally connected to the frame along a fourth common axis parallel to the other common axes below and to the rear of the second common axis, and means responsive to frontal impact for rotating the first and second links relative to the frame to lift and tilt back the passenger carrying means to protect the passenger.

2. Apparatus of claim 1 wherein the rear wheel is substantially larger in diameter than the front wheel.

3. Apparatus of claim 2 wherein the rear wheel comprises a low pressure tire forming a large footprint area in contact with the ground.

4. Apparatus of claim 1 wherein the engine is mounted behind the rear wheel, the center of mass of the vehicle and driver being slightly in front of the axle of the rear wheel so that substantially all the weight is carried by the rear wheel.

5. Apparatus of claim 4 further including means for shifting the position of the driver seat fore and aft to adjust the center of mass of the vehicle and driver so that at least 90% of the weight is on the rear wheel.

6. Apparatus of claim 1 further including a pair of small outrigger wheels laterally spaced on either side of the frame, and means for raising and lowering the outrigger wheels to lift them up or lower them into contact with the supporting surface.

7. Apparatus of claim 1 wherein the first and second links are sufficiently long to lift the seat above the rear wheel.

8. Apparatus of claim 1 further including bumper means extending around and in front of the front wheel, the means for rotating the first and second links including a linking arm means pivotally connected at the forward end to the bumper means and pivotally connected at the other end to the first pair of links, the linking arm means movably extending rearwardly and upwardly from the bumper means to the first pair of links, whereby rearward movement of the bumper on impact rotates the first pair of links upwardly about the second common axis to lift and tilt the seat in a backward direction.

* * * * *